Figure 1:
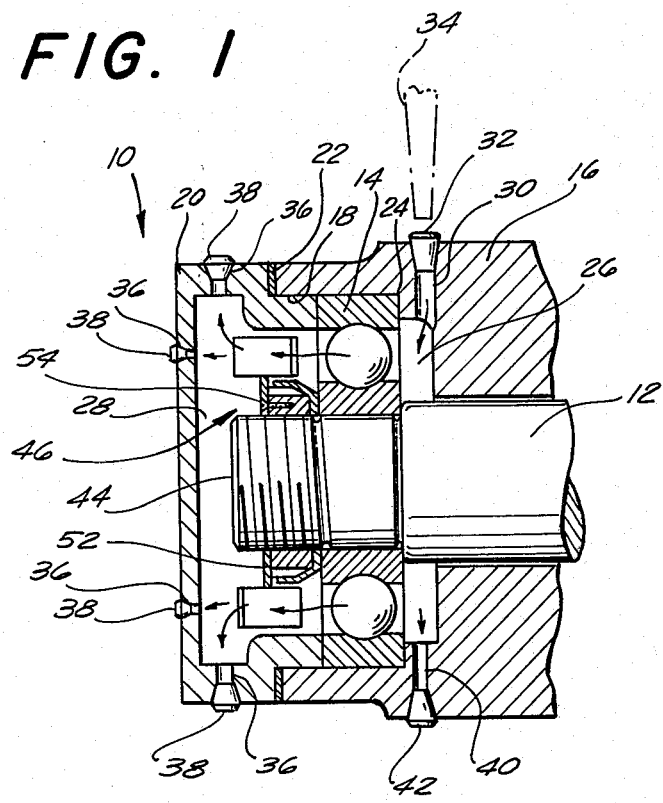

United States Patent [19]

Chivukula et al.

[11] 3,903,992
[45] Sept. 9, 1975

[54] DEVICE FOR REGREASING BEARINGS

[75] Inventors: Krishna Chivukula, Syracuse;
Wilfred J. Lee, East Syracuse, both of N.Y.

[73] Assignee: Clarkson Industries, Inc., Syracuse, N.Y.

[22] Filed: Feb. 21, 1974

[21] Appl. No.: 444,288

[52] U.S. Cl.................... 184/1 D; 308/93; 308/97
[51] Int. Cl.............................................. F01m 1/00
[58] Field of Search............... 184/1 D, 1 R, 104 R; 308/93, 92, 106, 107, 116, 115, 122, 97, 76, 78, 187

[56] References Cited
UNITED STATES PATENTS

| | | | |
|---|---|---|---|
| 2,959,457 | 11/1960 | Szymalak | 308/187 |
| 3,042,462 | 7/1962 | Rosskopf | 308/187 |

*Primary Examiner*—Richard C. Pinkham
*Assistant Examiner*—William R. Browne
*Attorney, Agent, or Firm*—Gordon K. Lister; Pasquale A. Razzano

[57] ABSTRACT

A device and method for regreasing a rotary bearing are disclosed in which the bearing is mounted in a bearing housing having a grease injection opening formed adjacent one side of the bearing and at least one discharge opening formed therein adjacent the other side of the bearing. A grease slinger plate is mounted on the rotary shaft supported by the bearing and is located adjacent said other side of the bearing for rotary movement with the shaft. The plate has at least one canted vane formed thereon at its periphery for urging grease from the bearing to and through the discharge opening. When regreasing the bearing, all openings in the housing are opened and grease is injected through the injection opening while the shaft is rotating so that new grease is urged by the vane through the bearing, while it simultaneously urges old grease out of the discharge opening.

8 Claims, 2 Drawing Figures

PATENTED SEP 9 1975   3,903,992

DEVICE FOR REGREASING BEARINGS

The present invention relates to a rotary shaft bearing and more particularly to a method and device for use in regreasing a rotary shaft bearing.

It is well known that in bearings of various types, and particularly rotary bearings, the lubricant or grease used to reduce friction in the bearing degenerates after a certain length of operation due to the friction and heat produced in the bearing. As a result, the bearing must be regreased at periodic intervals, as prescribed by the manufacturer.

Of course, in the regreasing operation, it is desirable to first remove the old degenerated grease from the bearing and its housing and then replace the grease with the proper amount of new grease. Such regreasing operations typically are achieved in a number of well known ways. For example, the operator may disassemble the entire bearing and bearing housing, remove the bearing from the housing and clean all or part of the bearing and the housing in kerosene or gasoline to remove all of the old grease. Once this is completed and the bearing and housing have dried, the operator then hand packs the bearing with the appropriate amount of new grease. While this method of regreasing is generally satisfactory in achieving the desired end, it is, unfortunately, time consuming and relatively expensive.

As an alternative to manual regreasing of the bearing, the regreasing can be performed simply by injecting new grease into a grease hole or a fitting adjacent the bearing at prescribed, and relatively frequent, intervals. Thus, the operator simply inserts the nozzle of a greased gun into the grease fitting and pumps new grease into the bearing. However, it will be appreciated that this method of regreasing the bearing does not remove old grease or dirt or grime from the bearing. Thus, this regreasing method is not entirely satisfactory.

Accordingly, it is an object of the present invention to provide a relatively simple device which will permit the regreasing of bearings and the simultaneous removal of old grease from the bearing.

Yet another object of the present invention is to provide a device that will remove old grease from a rotary bearing and regrease the bearing with new grease, while simultaneously avoiding any need to manually disassemble the bearing and housing.

Yet another object of the present invention is to provide a regreasing device for a rotary bearing which is relatively simple and inexpensive in construction.

A still further object of the present invention is to provide a method for regreasing the bearing which is relatively simple in operation.

In accordance with one aspect of the present invention the regreasing device disclosed herein is particularly adapted for use in regreasing the bearing of a rotary shaft. The device includes a housing for the bearing, with the housing having a pair of grease chambers respectively located on opposite sides of the bearing. A selectively openable grease injection opening or port (e.g. a grease fitting) is provided adjacent one side of the bearing in the housing to permit communication between one of the chambers and the exterior of the housing. On the other hand, a selectively openable grease discharge opening is provided in communication between the other of the chambers and the exterior of the housing. By this arrangement grease injected through the injection opening will be urged into the chamber associated with that opening and through the bearing into the chamber on the opposite side of the housing. This movement of grease will expel old grease from the bearing and the opposite chambers through the discharge opening of the housing, while simultaneously regreasing the bearing.

To assist in this operation, the present invention contemplates the provision of a grease discharge plate mounted on the shaft in the chamber adjacent the discharge opening. The plate has a pair of diametrically opposed canted vanes formed thereon at its periphery for forcing grease in the housing adjacent the bearing through the discharge opening and for simultaneously assisting in the movement of grease from the first chamber into which the new grease is injected through the bearing to the second chamber and out of the discharge opening.

It has been found that the provision of the rotary plate and vane assembly, in this manner, efficiently flushes the bearing of old and degenerated grease while simultaneously packing new grease into the bearing. Moreover, the rotation of the plate and canted vanes provides a breathing space in the bearing housing, as described more fully hereinafter, which serves to keep the bearing relatively cool.

Figure 2:
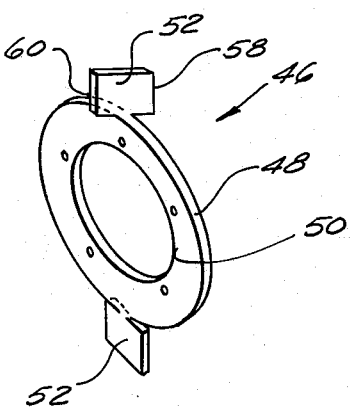

The above, and other objects, features, and advantages of this invention will be apparent in the following detailed description of an illustrative embodiment thereof which is to be read in connection with the accompanying drawings wherein:

FIG. 1 is a sectional view of a regreasing device constructed in accordance with the present invention and taken along the axis of a bearing and a shaft assembly; and FIG. 2 is a perspective view of the regreasing plate used in the device of the present invention.

Referring now to the drawing in detail, and initially to FIG. 1 thereof, it will be seen that a regreasing device 10, constructed in accordance with the present invention, is used in connection with a rotary shaft 12 which is rotatably supported for rotational movement by a conventional rotary ball bearing 14. The latter is mounted in a bearing housing 16 having an open end 18 which is closed by a bearing cap 20. The latter is removably mounted in end 18 of housing 16 in any convenient manner, as for example by a friction fit or screw threads (not shown) and an effective seal is formed between the cap and the housing by a gasket 22 or the like.

Housing 16 is constructed such that its internal contour and bearing 14 cooperate to define a pair of chambers 26, 28 on opposite sides of the bearing. This internal contour may include an annular shoulder 24 in which bearing 14 is seated.

Chamber 26 comprises a grease injection chamber which is in communication with the atmosphere through a port 30 formed in housing 16. This port has a conventional grease fitting 32 (or alternatively a removable plug) mounted therein which permits grease to be injected into chamber 26 through a conventional grease gun 34 (the nozzle of which is shown in dotted lines in FIG. 1) under manual or automatic pumping pressure.

Chamber 28, defined by cap 20, is selectively communicated with the exterior of the bearing assembly through a plurality of ports 36 which are also selectively opened and closed by conventional pipe plugs or seals 38. The ports 36 constitute grease discharge ports, through which old and new grease are expelled from the bearing assembly, as described hereinafter. One or more additional grease discharge ports 40 may also be formed in housing 16 in communication with chamber 26, as shown in the lower portion of FIG. 1. Of course these openings are also selectively closed by pipe plugs or fittings 42 in the conventional manner.

In accordance with a feature of the present invention, the end 44 of shaft 12 has a grease slinger or discharge plate 46 mounted thereon for rotation with the shaft. The grease slinger, more clearly illustrated in FIG. 2, consists of an annular plate 48 formed of sheet metal or the like, having a central opening 50 which receives the end 44 of shaft 12. The plate is secured to shaft 12 by a nut 52, with the plate being secured to the nut by a plurality of screws 54 or the like. Thus, after bearing 14 is mounted on shaft 12, nut 52 is turned onto the threaded end 44 of the shaft until it is in abutting engagement with the bearing. Grease slinger 46 is then fastened to nut 52 both of which will rotate with the shaft during the rotation thereof.

Regreasing plate 48 has a pair of canted vanes 52 formed integrally therewith at diametrically opposed locations along the periphery of the plate. The canted vanes are positioned such that they define leading and trailing ends 58, 60 respectively, with the plate being mounted on nut 52 such that the leading ends 58 of the canted vanes 52 are located adjacent the bearing in the direction of the rotation of shaft 12. That is, the leading edges 58 of the canted vanes will always be ahead of the trailing edges 60 in the direction of rotation of the shaft 12 and will also be closer to the bearing 14 than the trailing edges 60. The configuration of the vanes in this manner assists in the movement of grease through the bearing and the bearing assembly as described hereinafter.

The provision of a grease slinger or regreasing plate 48 in the manner described above makes the operation of regreasing the bearing assembly shown in FIG. 1 substantially as efficient as the more expensive hand cleaning and packing of bearings. Basically the plate serves to drive old grease between the bearing and the cap out through holes 36 during rotation of shaft 12, while simultaneously producing a slight suction which draws new grease from chamber 26 through the bearing.

The specific sequence of operation for the regreasing of the bearing shown in FIG. 1 proceeds as follows. First, all of the pipe plugs or fittings 38, are removed from the grease discharge holes and the grease fitting 32 is cleaned in preparation for the insertion of new grease into chamber 26. The shaft 12 is then rotated by the motor or device to which it is connected, and grease is injected into chamber 26 through the grease fitting 32. Since the grease is typically injected under pressure, the new grease will be forced through bearing 14 into chamber 28. Movement of new grease into chamber 26 and through bearing 14 will force the old grease in that chamber and in the bearing through the bearing and into chamber 28. Simultaneously, plate 48 and its vanes 52 create a slight suction in chamber 28 which serves to draw old grease in the bearing and chamber 26 into chamber 28. Moreover, it also serves to draw new grease through the bearing and into chamber 28.

Since initially only old grease passes through the bearing 14, the grease slinger 46 encounters this old grease first and, due to the canting arrangement of the vanes, forces the old grease outwardly away from the bearing into chamber 28 and adjacent to the open plugs 36, while simultaneously providing room in the bearing for the new grease to move into. In this manner the old grease in the bearing will be extruded out of the various grease discharge openings. At the same time new grease is continuously supplied to the bearing through grease fitting 32 until all of the old grease has been expelled. This is determined by the fact that once all of the old grease is expelled only new grease will be extruded through the discharge openings. Accordingly, the operator will know that substantially all of the old grease has been pushed out of the bearing and replaced by the new grease.

At this point the operator stops supplying new grease to the bearing, through fitting 32, but permits the shaft 12 to rotate for an additional, predetermined period of time such as, for example 20 minutes, while leaving all of the discharge openings in the assembly open. In this manner any excess new grease inadvertently placed in the bearing will be urged out of the bearing by the canted vanes on the greased discharge plate 48. That is, if the chambers 26 and 28 are fully packed with grease as a result of the initial portion of the greasing operation, the continued rotation of the plate will urge a portion of that grease out of the discharge openings, leaving the desired amount of grease for the bearing in the housing while removing the excess grease. Moreover, this continued operation of the shaft and rotation of vanes 52 to permit such further discharge of the new grease from the bearing, creates an air space next to the bearing in chamber 28. This air space allows the bearing to "breathe". That is, the creation of this air space will allow air to circulate adjacent the bearing so that the excessive temperature buildups in the bearing are avoided. This, of course, substantially increases the life of the bearing and also the life of the grease used in the regreasing operation.

After the bearing has been run with the ports 36 open in this manner for the predetermined time, the various drain holes are simply wiped clean and plugged by replacement of pipe plugs 38. At this point the regreasing operation is completed.

It will be appreciated that by this arrangement of the present invention, a very good flushing action is produced in the bearing. That is, most of the old grease is flushed out of the bearing and the bearing housing by the injection of new grease and the operation of the grease slinger 46. The new grease replaces the old grease in the bearing and in the housing. In fact, it has been found that the new grease will substantially pack all voids in the bearing before the extrusion of the old grease through the discharge ports takes place, since there is less resistance in the bearing to the filling of these voids than there is to movement of the old grease through the ports. In this manner the proper packing and greasing of the bearing 14 itself is insured.

Moreover, the common problem of overgreasing the bearing is impossible in the bearing assembly of the invention since the use of the grease slinger 46 insures that excess grease in the bearing housing will be discharged therefrom before the regreasing operation is completed. Of course, it is well known that the use of excess grease in the bearing will degenerate both the bearing itself and the lubricating grease. This is avoided in the present invention since overgreasing, as described above, is avoided and since the slinger 46 creates an air space next to the bearing which permits the bearing to breathe.

Although an illustrative embodiment of the present invention has been described herein with reference to the accompanying drawings, it will be understood that the invention is not limited to the precise embodiment and that various changes and modifications may be effected therein by one skilled in the art without departing from the scope or spirit of this invention.

What is claimed is:

1. A device for use in regreasing a bearing for a rotary shaft including a bearing, a shaft extending through said bearing, a bearing housing surrounding the bearing and a portion of said shaft, said housing having first and second grease chambers therein respectively located on opposite sides of the bearing, a grease injection opening formed therein providing communication between said first chamber and the exterior of said housing through which fresh grease is selectively injected into said housing and said first chamber, and at least one grease discharge opening formed therein providing communication between said second chamber and the exterior of said housing whereby grease injected under pressure into said first chamber is forced through said bearing into said second chamber and expels old grease in the housing through said discharge opening, and a grease discharge plate mounted on said shaft in said second chamber adjacent said bearing for rotary movement with said shaft, said grease discharge plate having at least one canted vane formed thereon at its periphery for forcing grease in said housing adjacent said bearing through said discharge opening during rotation of the shaft and for assisting the movement of grease in said first chamber through said bearing into said second chamber and out said discharge opening.

2. The device as defined in claim 1 wherein said plate is an annular member having a central opening receiving said shaft and a pair of diametrically opposed canted vanes formed on the periphery thereof.

3. The device as claimed in claim 2 wherein said housing has a plurality of grease discharge openings formed therein providing communication between said second chamber and the exterior of said housing.

4. The device as defined in claim 3 wherein said housing includes a removable bearing cap and said grease discharge openings are formed in said cap.

5. A device for use in regreasing a bearing for a rotary shaft including, a bearing, a shaft extending through said bearing, a housing for said bearing, said housing having first and second grease chambers therein respectively located on opposite sides of said bearing, a selectively openable grease injection opening providing communication between said first chamber and the exterior of said housing through which fresh grease is selectively injected into said housing and said first chamber, and at least one selectively openable grease discharge opening providing communication between said second chamber and the exterior of said housing whereby grease injected under pressure into said first chamber is forced through said bearing into said second chamber and expels old grease in the housing through said discharge opening, and a grease discharge plate mounted on said shaft in said second chamber for rotary movement with said shaft, said plate having a pair of diametrically opposed canted vanes formed thereon at its periphery for forcing grease in said housing adjacent said bearing through said discharge opening and for assisting the movement of grease in said first chamber through said bearing into said second chamber and out said discharge opening.

6. The device as defined in claim 5 wherein said vanes have leading and trailing edge portions with respect to the direction of rotation of said shaft, said leading edge portions of said vanes being closer to said bearing than said trailing edge portions thereby to urge grease adjacent to said bearing to positions away from the bearing during rotation of said shaft.

7. The device as defined in claim 6 wherein said housing includes a removable cap defining a portion of said second chamber and having said grease discharge port formed therein.

8. The device as defined in claim 7 wherein said openings are closed by removable plugs.

* * * * *